United States Patent
Wang et al.

(10) Patent No.: US 11,610,028 B2
(45) Date of Patent: Mar. 21, 2023

(54) SYSTEM AND METHOD FOR DESIGNING MEMS MIRROR BASED ON COMPUTED OSCILLATION FREQUENCY

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US); Gary Li, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/192,724

(22) Filed: Mar. 4, 2021

(65) Prior Publication Data

US 2022/0284139 A1    Sep. 8, 2022

(51) Int. Cl.
    *G06F 30/10*      (2020.01)
    *G01S 7/481*      (2006.01)
    (Continued)

(52) U.S. Cl.
    CPC .......... *G06F 30/10* (2020.01); *G01S 7/4817* (2013.01); *G02B 27/0012* (2013.01);
    (Continued)

(58) Field of Classification Search
    CPC ...... G06F 30/10; G06F 30/20; G06F 2111/10; G02B 27/0012; G02B 26/0841; G01S 7/4817; G01S 7/483; G01S 17/00
See application file for complete search history.

(56) References Cited

U.S. PATENT DOCUMENTS

| 7,034,370 B2 * | 4/2006 | Kuo | G02B 26/0841 |
| | | | 257/500 |
| 8,514,205 B2 * | 8/2013 | Davis | G02B 26/0841 |
| | | | 359/290 |

(Continued)

OTHER PUBLICATIONS

Patterson, P., et al. "A Scanning Micromirror with Angular Comb Drive Actuation" Technical Digest MEMS, IEEE Int'l Conf. 15th IEEE Int'l Conf. on Micro Electro Mechanical Systems (2002) available from <https://ieeexplore.ieee.org/abstract/document/984329> (Year: 2002).*

(Continued)

*Primary Examiner* — Jay Hann
(74) *Attorney, Agent, or Firm* — Bayes PLLC

(57) ABSTRACT

A method for designing an optical scanning mirror is provided. The method may include receiving, by a communication interface, a set of design parameters of the scanning mirror. The method may also include simulating scanning mirror oscillation, by at least one processor, based on the set of design parameters using a computer model. In certain aspects, the computer model may include a lookup table that correlates electrostatic force applied to a sample scanning mirror and angular displacement in the sample scanning mirror caused by the electrostatic force. The method may further include generating, by the at least one processor, mirror oscillation data as an output of the computer model for designing the scanning mirror. The mirror oscillation data may include a correlation of drive frequency, angular displacement, and time.

20 Claims, 9 Drawing Sheets

(51) Int. Cl.
  *G02B 26/08*   (2006.01)
  *G01S 7/483*   (2006.01)
  *G02B 27/00*   (2006.01)
  *G06F 111/10*   (2020.01)
  *G01S 17/00*   (2020.01)

(52) U.S. Cl.
  CPC ............... *G01S 7/483* (2013.01); *G01S 17/00* (2013.01); *G02B 26/0841* (2013.01); *G06F 2111/10* (2020.01)

(56) References Cited

U.S. PATENT DOCUMENTS

| | | | |
|---|---|---|---|
| 9,354,061 B2 * | 5/2016 | Krylov | G01C 19/5705 |
| 9,715,107 B2 * | 7/2017 | Gerson | G01S 17/10 |
| 10,768,410 B2 * | 9/2020 | Steiner | G02B 26/0841 |
| 2021/0271072 A1 * | 9/2021 | Schroedter | G01S 7/4817 |

OTHER PUBLICATIONS

Hah, D., et al. "Theory and Experiments of Angular Vertical Comb-Drive Actuators for Scanning Micromirrors" IEEE J. of Selected Topics in Quantum Electronics, vol. 10, No. 3 (2004) (Year: 2004).*

* cited by examiner

401

| RADIAN | TORQUE |
|---|---|
| -0.20933 | 2.51077 |
| -0.20061 | 2.98148 |
| -0.19189 | 3.56263 |
| -0.18317 | 4.32874 |
| -0.17444 | 5.37852 |
| -0.16572 | 6.91637 |
| -0.157 | 9.06975 |
| -0.11339 | 139.318 |
| -0.10467 | 231.561 |
| -0.03489 | 269.469 |
| -0.02617 | 284.238 |
| -0.01744 | 276.884 |
| -0.00872 | 256.167 |
| 0 | 10.8527 |
| 0.008722 | -256.167 |
| 0.017444 | -276.884 |
| 0.026167 | -284.238 |
| 0.034889 | -269.469 |
| 0.043611 | -269.071 |
| 0.148278 | -12.5026 |
| 0.157 | -9.06975 |
| 0.165722 | -6.91637 |
| 0.174444 | -5.37852 |
| 0.183167 | -4.32874 |
| 0.191889 | -3.56263 |
| 0.200611 | -2.98148 |
| 0.209333 | -2.51077 |

FIG. 4B

SYSTEM AND METHOD FOR DESIGNING MEMS MIRROR BASED ON COMPUTED OSCILLATION FREQUENCY

TECHNICAL FIELD

The present disclosure relates to designing a scanning mirror used in an optical sensing system, and more particularly to, a method for designing a scanning mirror by generating mirror oscillation data using a computer model to simulate scanning mirror oscillation associated with a set of design parameters.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system may include a transmitter configured to emit a light beam to scan an object and a receiver configured to receive the light beam reflected by the object. The transmitter and the receiver may use optical components (e.g., a scanning mirror) to steer the light beam to a range of directions. A scanning mirror can be a single micro mirror, or an array of micro mirrors integrated into a micromachined mirror assembly made from semiconductor materials such as single crystal silicon using microelectromechanical system (MEMS) technologies. In certain applications, a MEMS mirror may be operated at or near resonance. Using resonance may enable optical sensing systems to obtain large mirror scanning angles in a relatively small drive voltage as compared to a non-resonating mirror. A MEMS mirror may resonate at or near its characteristic oscillation frequency, which may be determined by the design parameters associated with the scanning mirror, other components of the scanner, and/or transmitter.

These design parameters may include, e.g., mirror size, Q-factor, comb finger number, distance between comb fingers, length of comb fingers, drive frequency and amplitude, spring dimension, linear spring constant, spring nonlinearity, just to name a few. These design parameters are usually determined during the design phase so that the scanning mirror meets one or more target performance characteristic(s), e.g., such as a target mirror oscillation frequency. Currently available techniques for computing performance characteristics during the design phase requires an undesirable amount of time and computational resources, which makes these techniques difficult or impractical to implement. Hence, it is beneficial to compute target performance characteristics accurately and efficiently during the design phase for a scanning mirror.

Embodiments of the disclosure address the above problems by providing a method for computing the performance characteristics with a reduced amount of time and computational resources as compared to the currently available techniques and a computational toolbox comprising a plurality of functional blocks configured as a computer model for simulating the scanning mirror oscillation.

SUMMARY

Embodiments of the disclosure provide a method for designing an optical scanning mirror. The method may include receiving, by a communication interface, a set of design parameters of the scanning mirror. The method may also include simulating scanning mirror oscillation, by at least one processor, based on the set of design parameters using a computer model. In certain aspects, the computer model may include a lookup table that correlates electrostatic force applied to a sample scanning mirror and angular displacement in the sample scanning mirror caused by the electrostatic force. The method may further include generating, by the at least one processor, mirror oscillation data as an output of the computer model for designing the scanning mirror. The mirror oscillation data may include a correlation of drive frequency, angular displacement, and time.

Embodiments of the disclosure provide a non-transitory computer-readable medium having a computational toolbox stored thereon. The computational toolbox may be configured to simulate scanning mirror oscillation using a set of design parameters. More specifically, the computational toolbox may comprise a plurality of functional blocks configured as a computer model for simulating the scanning mirror oscillation. The functional blocks may include a lookup table block storing a lookup table that correlates electrostatic force applied to a sample scanning mirror and angular displacement in the sample scanning mirror caused by the electrostatic force.

Embodiments of the disclosure provide an apparatus for designing a scanning mirror for an optical sensing system. The apparatus may include a communication interface configured to receive a set of design parameters of the scanning mirror. The apparatus may further include a memory configured to store a computer model configured to simulate scanning mirror oscillation. The apparatus may further include at least one processor coupled to the memory. The at least one processor may be configured to simulate scanning mirror oscillation, by at least one processor, based on the set of design parameters using a computer model. The computer model may include a lookup table that correlates electrostatic force applied to a sample scanning mirror and angular displacement in the sample scanning mirror caused by the electrostatic force. The at least one processor may be configured to generate, by the at least one processor, mirror oscillation data as an output of the computer model for designing the scanning mirror. The mirror oscillation data may include a correlation of drive frequency, angular displacement, and time.

It is to be understood that both the foregoing general description and the following detailed description are exemplary and explanatory only and are not restrictive of the invention, as claimed.

BRIEF DESCRIPTION OF THE DRAWINGS

FIG. 4B illustrates an exemplary lookup table that correlates electrostatic force and angular displacement, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

As mentioned above, the oscillation frequency, and, hence, the scanning mirror performance is directly affected by the set of design parameters (e.g., mirror size, Q-factor, comb finger number, distance between comb fingers, length of comb fingers, drive frequency and amplitude, spring dimension, linear spring constant, spring nonlinearity, just to name a few) used to form the scanning mirror. Different optical sensing system implementations may have different performance requirements, such as a target oscillation frequency. The oscillation frequency of a scanning mirror may affect, among other things, its scanning angle. Hence, being able to compute the performance characteristics (e.g., oscillation frequency, scanning angle, etc.) with a high degree of accuracy and efficiency during the design phase may be beneficial, particularly when designing a scanning mirror for an optical sensing system with specific performance requirements. If the performance characteristics of a scanning mirror are not met using an initial set of design parameters, the design parameters need to be adjusted until that target performance characteristics is achieved. However, currently available techniques for computing performance characteristics use an undesirable amount of time and computational resources, which makes these techniques difficult or impractical to implement.

Figure 2:
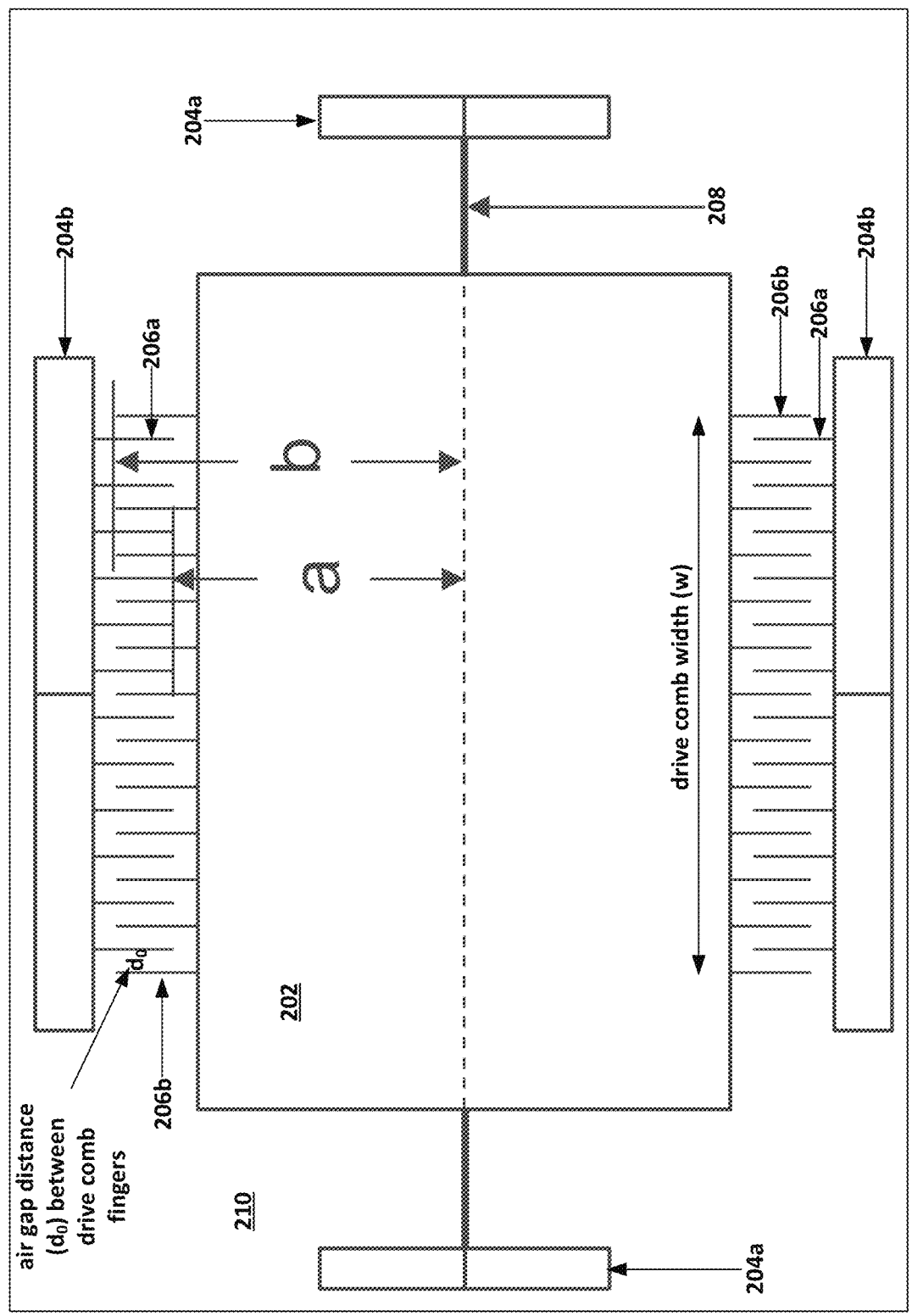
FIG. 2 illustrates a top view of an exemplary scanning mirror design, according to embodiments of the disclosure.

For example, the performance characteristics of a scanning mirror may be computed by finding solutions for Equation (1), which is the governing equation of motion for a rigid body as shown schematically in FIG. 2:

$$J\frac{\partial^2 \theta}{\partial t^2} + d\frac{\partial \theta}{\partial t} + k(\theta + r_3\theta^3) = \sum_{i=1}^{N} f(\theta)L_i V^2(t) \quad (1)$$

where $\theta$ is the angular displacement, J is the mirror rotational moment of inertia, d is a damping coefficient, k is a rotational spring constant, N is the number of drive comb units, and $f(\theta)$ is the electrostatic force from a single comb drive under a unit voltage as a function of angular displacement, $L_i$ is equivalent arm length of the comb drive relative to the rotation axis, $r_3$ is a ratio of the cubic nonlinear spring constant over the linear spring constant, and V(t) is the drive voltage.

Conventional methods for solving Equation (1) may include making mathematical approximations in order to simplify the computation of simulating scanning mirror oscillation using the set of design parameters. Otherwise, due to the complexity of the computations associated with Equation (1), the computation may crash before solutions for the performance characteristics are found. However, solving Equation (1) using mathematical approximations may result in a high degree of inaccuracy that makes using such techniques impractical.

Thus, there is an unmet need for a technique that generates performance characteristic data for a scanning mirror with reduced time and the high degree of accuracy needed in designing scanning mirrors for sensing applications, such as in autonomous driving systems and/or high-definition map surveys.

To overcome the challenges described above, the present disclosure provides a method for computing performance characteristics that uses a lookup table that correlates electrostatic force and angular displacement, which simplifies the computational complexity without introducing inaccuracies in the generated solutions, as compared to the currently available techniques, e.g., additional details of which are described below in connection with FIGS. 1-6. Moreover, the present disclosure provides a computational toolbox that includes a plurality of functional blocks configured as a computer model to simulate mirror oscillation and compute the associated performance characteristics, e.g., additional details of which are set forth below in connection with FIGS. 1-6.

Some exemplary embodiments are described below with reference to a scanning mirror used in LiDAR system(s), but the application of the scanning mirror assembly disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

Figure 1:
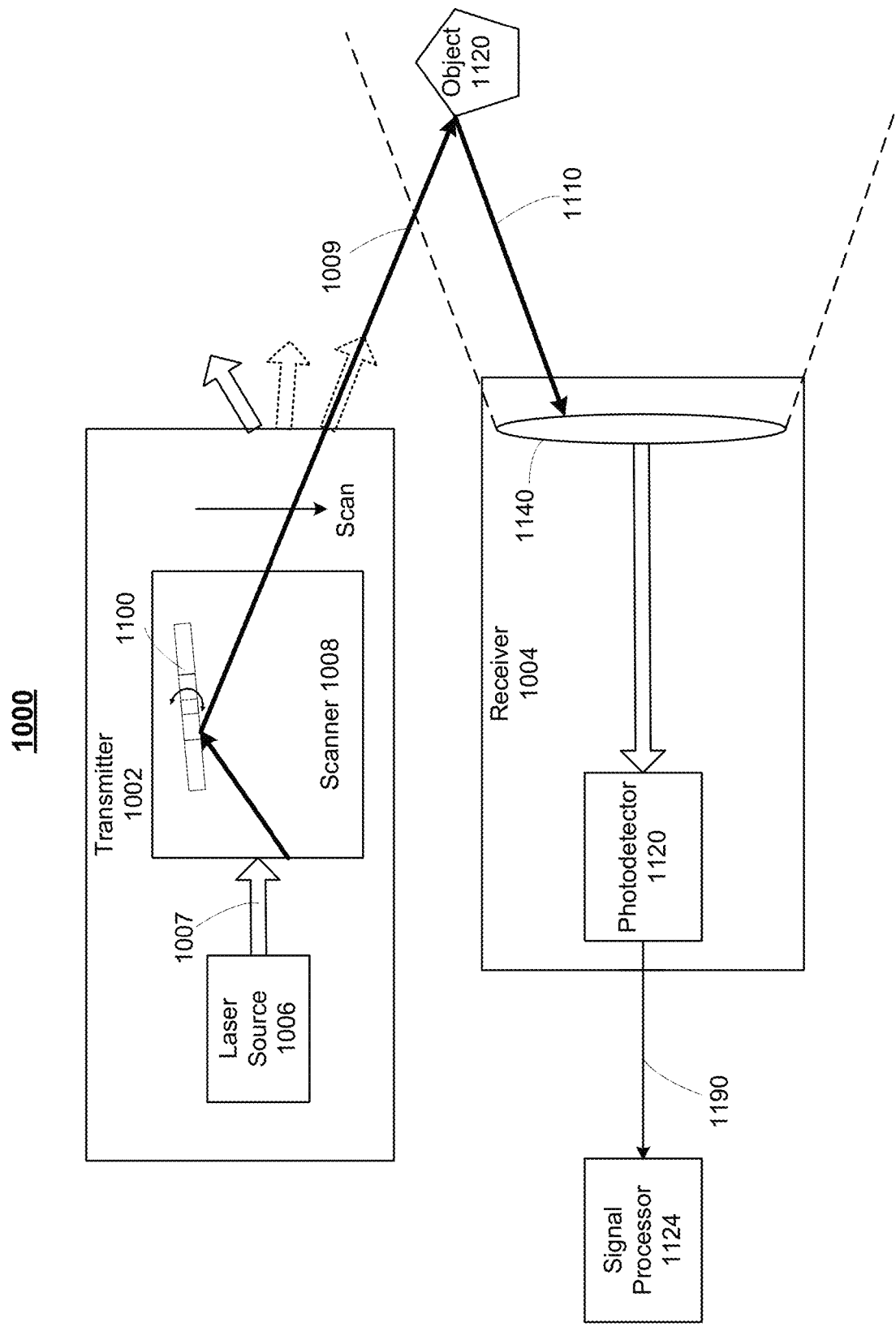
FIG. 1 illustrates a block diagram of an exemplary LiDAR system, according to embodiments of the disclosure.

FIG. 1 illustrates a block diagram of an exemplary LiDAR system 1000, according to embodiments of the disclosure. LiDAR system 1000 may include a transmitter 1002 and a receiver 1004. Transmitter 1002 may emit laser beams along multiple directions. Transmitter 1002 may include one or more laser sources 1006 and a scanner 1008.

Transmitter 1002 can sequentially emit a stream of pulsed laser beams in different directions within a scan range (e.g., a range in angular degrees), as illustrated in FIG. 1. Laser source 1006 may be configured to provide a laser beam 1007 (also referred to as "native laser beam") to scanner 1008. In some embodiments of the present disclosure, laser source 1006 may generate a pulsed laser beam in the ultraviolet, visible, or near infrared wavelength range.

In some embodiments of the present disclosure, laser source 1006 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 1007 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as light source 1006 for emitting laser beam 1007.

Scanner 1008 may be configured to emit a laser beam 1009 to an object 1120 in a direction within a range of scanning angles. In some embodiments consistent with the present disclosure, scanner 1008 may include a micromachined mirror assembly having a scanning mirror, such as MEMS mirror 1100. In some embodiments, at each time point during the scan, scanner 1008 may emit laser beam 1009 to object 1120 in a direction within a range of scanning angles by rotating the micromachined mirror assembly. MEMS mirror 1100, at its rotated angle, may deflect the laser beam 1007 generated by laser sources 1006 to the desired direction, which becomes laser beam 1009. The micromachined mirror assembly may include various components that enable, among other things, the rotation of the MEMS mirror 1100. For example, the micromachined mirror assembly may include, among other things, a scanning mirror (e.g., MEMS mirror 1100), a first set of anchors, one or more actuators each coupled to an anchor in the first set of anchors, a second set of anchors, at least one spring coupled to at least one anchor in the set of anchors, and a substrate, just to name a few.

Certain design parameters of the MEMS mirror 1100 may impact its performance. Such design parameters may include, e.g., mirror dimensions, Q-factor, comb finger number, distance between comb fingers, length of comb fingers, drive frequency and amplitude, spring dimension, linear spring constant, spring nonlinearity, just to name a few. Thus, it may be beneficial to design a MEMS mirror 1100 using an interactive process by tailoring the design parameters gradually such that the mirror performance approaches the target performance requirements.

The present disclosure provides a method that enables the adjustment of the design parameters during the design phase for a sample scanning mirror, such as MEMS mirror 1100. These adjustments may be made based on computed performance characteristics. For example, the performance characteristics computed for an initial set of design parameters may be compared to target performance characteristics. When the computed performance characteristics meet the target performance characteristics, the initial set of design parameters may be those used to manufacture the scanning mirror. Otherwise, when the computed performance characteristics do not meet the target performance characteristics, an adjusted set of design parameters may be proposed, and the simulation may be rerun. A subsequent determination may be made as to whether the target performance characteristics are met using the adjusted set of design parameters. The design parameters may be continuously adjusted until a scanning mirror design that meets the target performance characteristics is achieved. In certain implementations, the method may determine appropriate design alterations based on a comparison of the computed performance characteristic(s) and target performance characteristic(s). Additional details associated with computing performance characteristics and the computational toolbox used to do so are set forth below in connection with FIGS. 2-6.

Still referring to FIG. 1, object 1120 may be made of a wide range of materials including, for example, non-metallic objects, rocks, rain, chemical compounds, aerosols, clouds and even single molecules. In some embodiments of the present disclosure, scanner 1008 may also include optical components (e.g., lenses) that can focus pulsed laser light into a narrow laser beam to increase the scan resolution.

In some embodiments, receiver 1004 may be configured to detect a laser beam 1110 returned from object 1120. The returned laser beam 1110 may be in a different direction from laser beam 1009. Receiver 1004 can collect laser beams returned from object 1120 and output electrical signals reflecting the intensity of the returned laser beams. Upon contact, laser light can be reflected by object 1120 via backscattering, such as Raman scattering and/or fluorescence. As illustrated in FIG. 1, receiver 1004 may include a lens 1140 and a photodetector 1120. Lens 1140 may be configured to collect light from a respective direction in its FOV and converge the laser beam to focus before it is received on photodetector 1120. At each time point during the scan, returned laser beam 1110 may be collected by lens 1140. Returned laser beam 1110 may be returned from object 1120 and have the same wavelength as laser beam 1009.

Photodetector 1120 may be configured to detect returned laser beam 1110 returned from object 1120. In some embodiments, photodetector 1120 may convert the laser light (e.g., returned laser beam 1110) collected by lens 1140 into an electrical signal 1190 (e.g., a current or a voltage signal). Electrical signal 1190 may be generated when photons are absorbed in a photodiode included in photodetector 1120. In some embodiments of the present disclosure, photodetector 1120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 1000 may also include one or more signal processor 1124. Signal processor 1124 may receive electrical signal 1190 generated by photodetector 1120. Signal processor 1124 may process electrical signal 1190 to determine, for example, distance information carried by electrical signal 1190. Signal processor 1124 may construct a point cloud based on the processed information. Signal processor 1124 may include a microprocessor, a microcontroller, a central processing unit (CPU), a graphical processing unit (GPU), a digital signal processor (DSP), or other suitable data processing devices.

FIG. 2 illustrates a top view of an exemplary scanning mirror design 200, according to embodiments of the disclosure. Various aspects of the scanning mirror design 200 may be used (e.g., during the design phase) to compute performance characteristics of a scanning mirror 202 (e.g., MEMS mirror 1100).

For example, the scanning mirror design 200 may include an initial set of design parameters that may be used to compute the mirror's performance characteristics. In some embodiments, the first set of design parameters may be associated with one or more components of a scanning mirror assembly. Such components may include at least one of, e.g., a scanning mirror 202 (e.g., MEMS mirror 1100), a first set of anchors 204a, a second set of anchors 204b, fixed drive comb fingers 206a coupled to anchors 204b, sliding drive comb fingers 206b coupled to the scanning mirror 202, a torsion spring 208, and/or a substrate 210, just to name a few.

In some embodiments, the initial set of design parameters may be parameters of these components, and any change to these parameters may affect the scanning mirror performance characteristics (e.g., scanning angle, oscillation frequency, etc.). For example, the initial set of design parameters may include dimensions (e.g., length, width, and thickness) of the above components, e.g., dimensions of the scanning mirror 202 and dimensions of the drive comb, and distances between these components, e.g., the distance between the scanning mirror 202 and the anchors 204b. Other examples of the initial set of design parameters may include one or more of the materials of these components, the characteristic frequency of the scanning mirror 202, total overlap area for all drive comb fingers 206a, 206b, air gap spacing between components (e.g., the air gap between fixed drive comb fingers 206a and the sliding drive comb fingers 206b), drive voltage frequency, silicon density, and the moment of inertia of the scanning mirror, just to name a few.

In some embodiments, the performance characteristics may be calculated using the initial set of design parameters and computations according to, e.g., Equations (2)-(7) set forth below. When a sinusoidal drive voltage is applied to drive comb fingers 206a, 206b, the drive voltage (V) in Equation (1) can be expressed as seen below in Equation (2):

$$V = Vcm + \frac{Vpp}{2}\sin(\Omega t) \quad (2)$$

where Vcm is the direct current (DC) voltage, Vpp is peak-to-peak alternating current (AC) voltage, $\Omega$ is drive voltage frequency, and t is time. To implement a numerical simulation that computes performance characteristics, the computer model of the present disclosure may convert the above dimensional Equation (1) into non-dimensional Equation (3), which may be rewritten as Equation (4), by introducing a non-dimensional time $\tau$. Computing solutions for non-dimensional Equation (4) may simplify the computations performed during the scanning mirror simulation. In terms of oscillation frequency, dimensions of Hz (1 Hz=1 revolution per second) or kHz are typically used. However, when performing mathematical computations, dimensions of Hz is not numerically compatible, and hence, non-dimensional 'radian' is used by the present computer model. The computer model of the present disclosure may be configured to divide the time into time steps, e.g., two time steps, ten time steps, 20 time steps, 100 time steps per period, etc., to numerically integrate Equation (3):

$$\frac{\partial^2 \theta}{\partial \tau^2} + \frac{1}{Q}\frac{\partial \theta}{\partial \tau} + (\theta + r_3\theta^3) = \beta f(\theta)(\gamma + \sin(\omega\tau))^2 \quad (3)$$

or

-continued $$\ddot{\theta} = -\frac{1}{Q}\dot{\theta} - (\theta + r_3\theta^3) + \beta f(\theta)(\gamma + \sin(\omega\tau))^2 \quad (4)$$

where Q is the quality factor, and $r_3$ is a ratio of cubic non-linear spring constant over the linear spring constant. The mathematical expressions of $\gamma$, $\beta$, and $\omega$ are given below in Equation (5):

$$\gamma = \frac{2Vcm}{Vpp} \quad \& \quad \beta = \sum_{i=1}^{N}\frac{L_i}{J\omega_n}\left(\frac{Vpp}{2}\right)^2 \quad \& \quad \omega = \frac{\Omega}{\omega_n} \quad (5)$$

where $\omega_n$ is the mirror's characteristic oscillation frequency, and $\tau$ is a non-dimensional time. The computer model of the present disclosure may compute solutions for Equation (4). The non-dimensional time and frequency terms in the computed solutions may then be converted back to real time and real frequency using the mathematical expressions of Equation (6):

$$t = \frac{\tau}{\omega_n} \quad \& \quad \Omega = \omega\omega_n. \quad (6)$$

Exemplary operations used by the computer model for solving Equation (4) are described below in connection with FIGS. 3A-4.

Figure 3A:
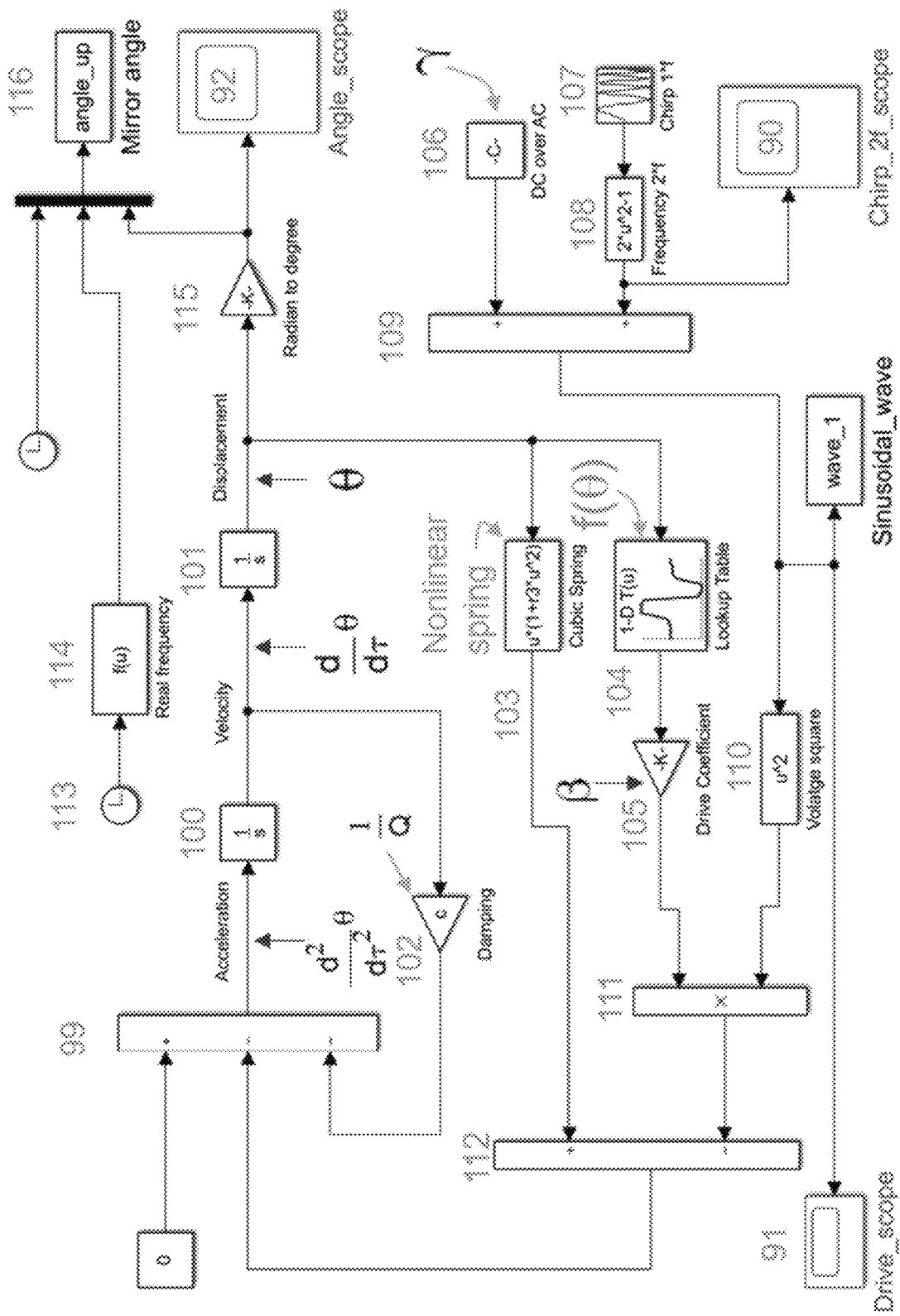
FIG. 3A illustrates a first exemplary computational toolbox including a plurality of functional blocks configured as a computer model for simulating the scanning mirror oscillation, according to embodiments of the disclosure.
Figure 3B:
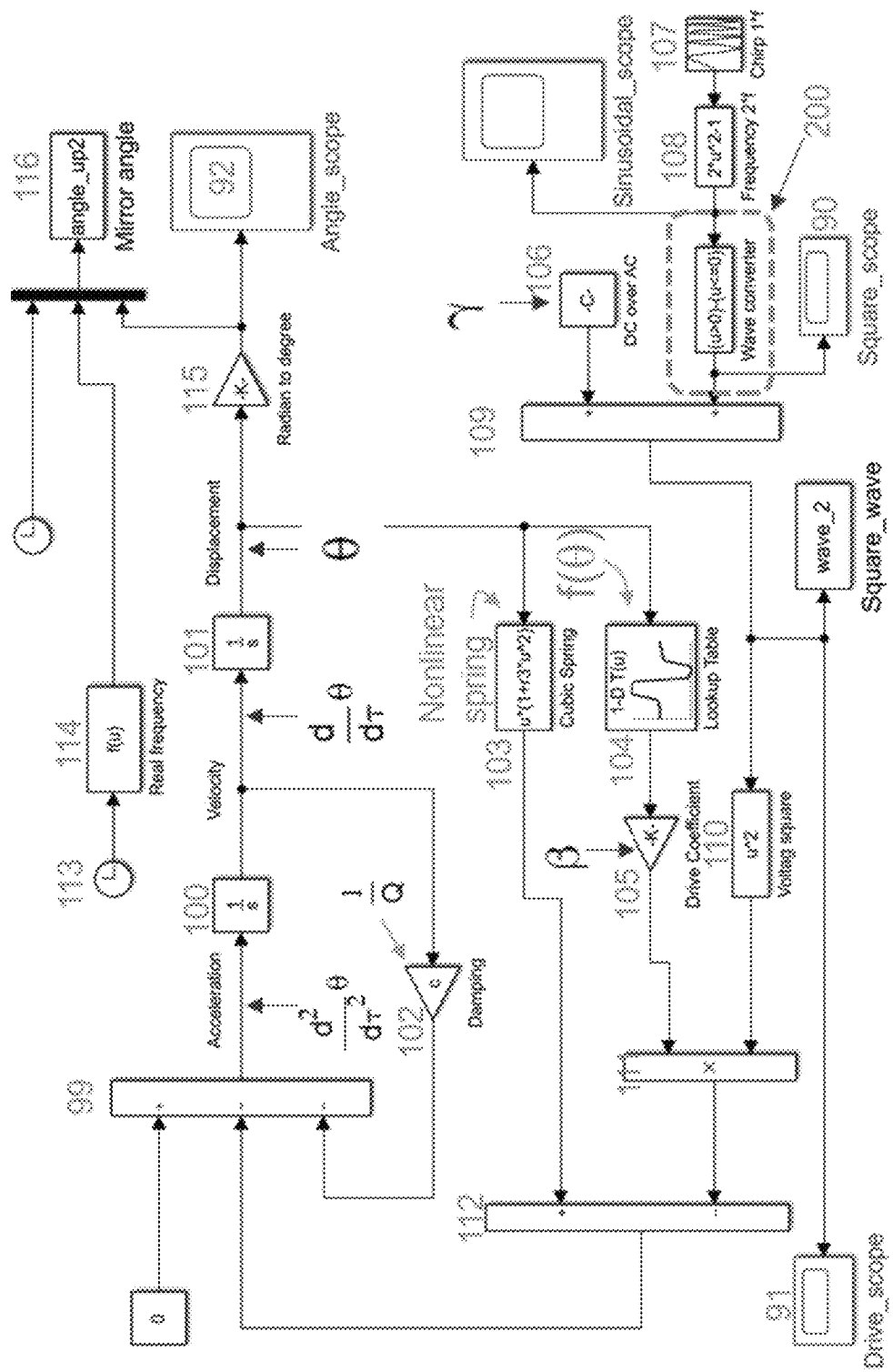
FIG. 3B illustrates a second exemplary computational toolbox including a plurality of functional blocks configured as a computer model for simulating the scanning mirror oscillation, according to embodiments of the disclosure.
Figure 3C:
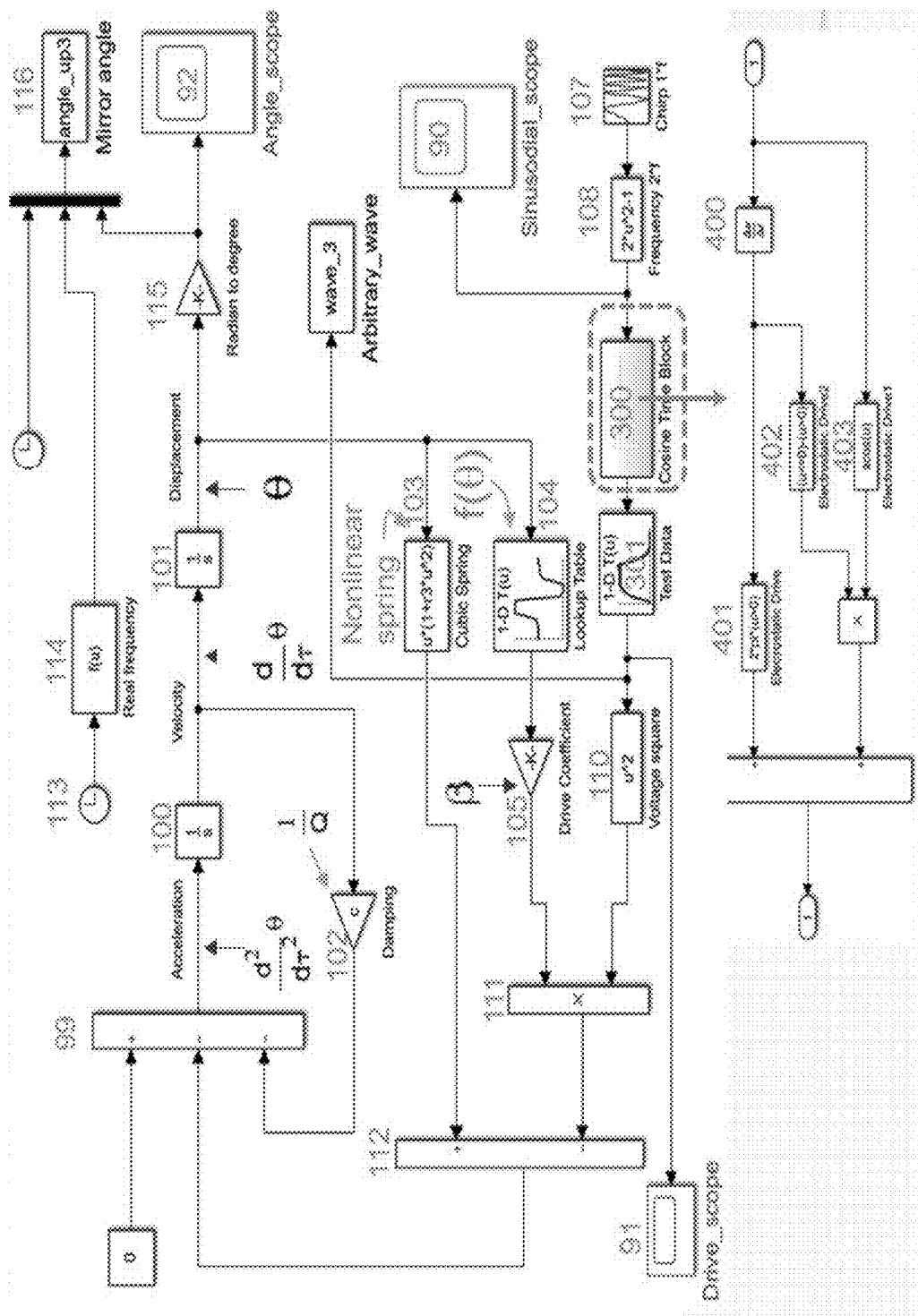
FIG. 3C illustrates a third exemplary computational toolbox including a plurality of functional blocks configured as a computer model for simulating the scanning mirror oscillation, according to embodiments of the disclosure.
Figure 4A:
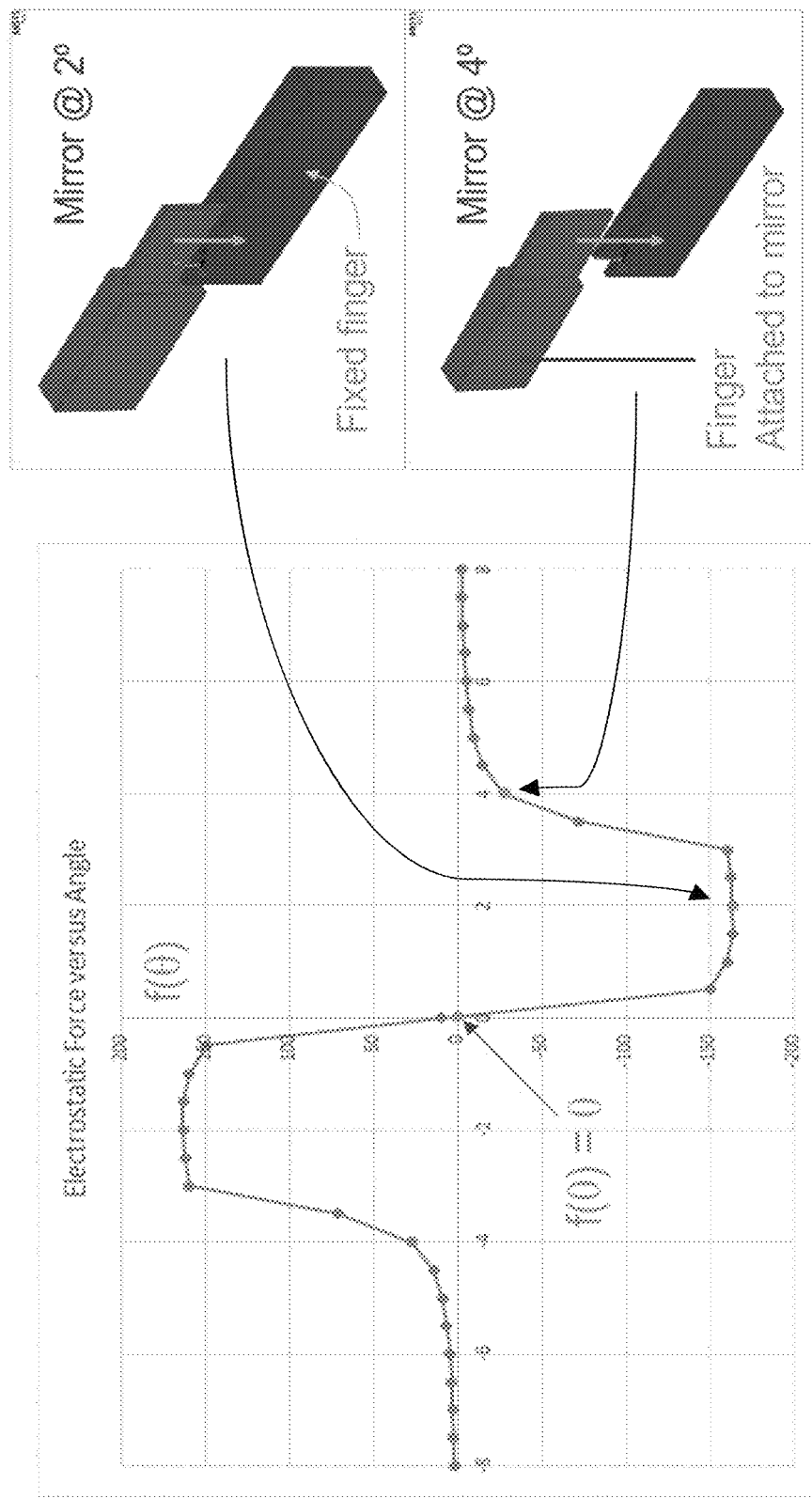
FIG. 4A illustrates a graphical representation of electrostatic force as a function of angular displacement, according to embodiments of the disclosure.

FIG. 3A illustrates a first exemplary computational toolbox 309 configured as a computer model for simulating the scanning mirror oscillation, according to embodiments of the disclosure. FIG. 3B illustrates a second exemplary computational toolbox 310 configured as a computer model for simulating the scanning mirror oscillation, according to embodiments of the disclosure. FIG. 3C illustrates a third exemplary computational toolbox 315 configured as a computer model for simulating the scanning mirror oscillation, according to embodiments of the disclosure. FIG. 4A illustrates a graphical representation 400 of a lookup table that correlates electrostatic force as a function of angular displacement, according to embodiments of the disclosure. FIG. 4B illustrates a lookup table that correlates electrostatic force (or torque) and angular displacement. FIGS. 3A-4B will be described together.

Referring to FIG. 3A, the first computational toolbox 309 may include a plurality of functional blocks configured as a computer model for simulating the scanning mirror oscillation based on an associated set of design parameters. Various information associated with the set of design parameters may be used as inputs to one or more functional blocks as described below. Moreover, each of the functional blocks illustrated in FIGS. 3A-3C may be configured to perform static and/or dynamic operations that in totality comprise the computer model used to solve Equation (4) and then convert non-dimensional quantities back to dimensional quantities to find solutions to Equation (1). For simplicity, except those functional blocks that are included in either second computational toolbox 310 or third computational toolbox 315 but omitted from first computational toolbox 309, each of the functional blocks will be described below with respect to FIG. 3A. However, it would be readily apparent to one of ordinary skill that the same or similarly labeled functional blocks in second computational toolbox 310 of FIG. 3B and/or third computational toolbox 315 of FIG. 3C may perform the same or similar operations as those described in connection with their counterpart functional blocks in first computational toolbox 309 of FIG. 3A.

Referring to FIG. 3A, first computational toolbox 309 may include a first integrator 100 configured to convert angular acceleration information $\ddot{\theta}$ to angular velocity information $\dot{\theta}$. First integrator 100 may send the angular velocity information $\dot{\theta}$ to a second integrator 101. Second integrator 101 may be configured to convert the angular velocity information $\dot{\theta}$ to angular displacement information θ.

Angular velocity information $\dot{\theta}$ may be input into a damping force block 102, which is configured to compute a damping force $$\frac{1}{Q}\dot{\theta}$$

based at least in part on the angular velocity information $\dot{\theta}$ and Q-factor information, which is a design parameter that is input into damping force block 102 prior to or at the start of the simulation. Damping force information $$\frac{1}{Q}\dot{\theta}$$

may be input into first adder 99, which may insert a negative sign '−' to the damping force information $$\frac{1}{Q}\dot{\theta}$$

as seen in Equation (4)

$$\left(\text{e.g.,} -\frac{1}{Q}\dot{\theta}\right).$$

Angular displacement information θ may be input into a spring force block 103, which may be configured to compute the spring force term $(\theta+r_3\theta^3)$ in Equation (4) based at least in part on the angular displacement information θ and spring constant ratio $r_3$. The spring constant ratio $r_3$ may be a design parameter that may be input into spring force block 103 prior to or at the start of the simulation. Once computed, spring force term $(\theta+r_3\theta^3)$ may be input into first adder 99, which may also insert a '−' sign in front of this term. First adder 99 may be configured to sum the negative damping force information $$-\frac{1}{Q}\dot{\theta}$$

and negative spring force term $-(\theta+r_3\theta^3)$, the summation of which is the $$`-\frac{1}{Q}\dot{\theta} - (\theta + r_3\theta^3)`$$

from Equation (4), which may be input into second adder 112.

Still referring to FIG. 3A, first computational toolbox 309 may further include a first waveform block 107 configured to generate sinusoidal waveform information sin(ωτ) associated with a drive voltage applied to the comb drive fingers 204a, 204b. Frequency ω may be the characteristic oscillation frequency associated with a scanning mirror and may vary depending on the set of design parameters. The characteristic oscillation frequency ω may be computed based at least in part on the scanning mirror's Q-factor (e.g., which may be computed prior to or at the start of the simulation). Once computed, information associated with the characteristic oscillation frequency ω may be input into first waveform block 107. First waveform block 107 may be a sinusoidal waveform generator 'sin (ωτ)' where frequency ω can be varied from low to high (up sweeping) or from high to low (down sweeping). Frequency doubler 108 may be configured to double the waveform frequency ω to simulate driving the scanning mirror with a voltage whose frequency is twice waveform frequency ω. A drive voltage frequency that is twice the mirror's characteristic oscillation frequency ω is used to sustain oscillation around an axis of rotation.

In the example embodiment illustrated in FIG. 3B, rather than being driven with a drive voltage of a sinusoidal waveform, scanning mirror 202 may be driven using a drive voltage of a square waveform described below in Equation (7):

$$V = \begin{cases} +1 & \text{for first half cycle}\,(0\text{ to }\pi) \\ -1 & \text{for second half cycle}\,(\pi\text{ to }2\pi) \end{cases}. \quad (7)$$

Still referring to FIG. 3B, operations associated with Equation (7) may be implemented using second waveform block 200, where (u>0) returns +1 for u>0 and otherwise returns 0, and (u≤0) returns +1 for u≤0 and otherwise returns 0. In second waveform block 200, 'u' may represent the drive voltage signal. However, in other functional blocks described herein, 'u' may represent an angular displacement signal, an angular velocity signal, or an angular acceleration signal.

In the example embodiment illustrated in FIG. 3C, rather than using a sinusoidal or square waveform, the sinusoidal waveform may be converted to a predetermined waveform shape that is non-sinusoidal (also referred to as "arbitrary") by third waveform block 300. Since the driving frequency is varying for the chirping signal output by frequency doubler 108, the driving voltage amplitude may be saved in a lookup table block 301 for a single period from 0 to 2π. Third block 300 may be configured to input a phase from 0 to 2π to arbitrary waveform block 301, as expressed below in Equation (8):

$$phase = \begin{cases} \mathrm{acos}\,(\text{Amplitude}), & \text{for derivative } \leq 0 \\ 2\pi - \mathrm{acos}\,(\text{Amplitude}), & \text{for derivative } > 0 \end{cases} \quad (8)$$

where the '(Amplitude)' term is the amplitude of the chirping signal output by frequency doubler 108. Since the signal output by frequency doubler 108 is sinusoidal, over a single period, half of the signal has negative derivative (going down) and the other half has positive derivative (going up). Derivative block 400 represents these derivatives. Blocks 401, 402, 403 produces an output that ranges from 0 to 2π at the same frequency as frequency doubler 108. Combining third waveform block 300 and lookup table block 301, a driving voltage with a non-sinusoidal waveform having the same frequency as the sinusoidal signal output by first waveform block 108 may be achieved.

Referring again to FIG. 3A, first computational toolbox 309 may include a first coefficient block 106 configured to compute γ (first coefficient) based at least in part on the set of design parameters. For example, γ may be computed using Equation (5), shown above. Information associated with first coefficient γ may be input into second adder 109. Second adder 109 may be configured to compute the drive voltage term (γ+sin(ωτ)) from Equation (4) by summing the information received from first waveform block 107 and first coefficient block 106. Drive voltage information γ+sin(ωτ) may be input into square block 110, which may output a square of drive voltage (γ+sin(ωτ))² to the multiplier 111.

First computational toolbox 309 may include a lookup table block 104 comprising a lookup table that correlates electrostatic force/torque f of the comb drive fingers 214a, 214b as a function of angular displacement θ. As illustrated in FIG. 4A, a graphical representation 400 of f(θ) may be generated for a single comb drive unit (e.g., a single fixed drive comb finger 206a and the counterpart sliding drive comb fingers 206b) for simplicity. Then, the electrostatic force computed for a single comb drive unit may be multiplied by the total number of comb drive units indicated in the set of design parameters to determine the total electrostatic force that is included in the lookup table.

Because the electrostatic force as a function of angular displacement is nonlinear, generating the lookup table may include operations performed incrementally across the entirety of the mirror's scanning angle (e.g., from −8 degree to +8 degree). For example, the electrostatic force may be computed in 0.25 degree increments from −8 degree to +8 degree. Using the same example, once the electrostatic force is computed for 0.25 degree, the electrostatic force is then computed for an angular displacement of 0.5 degree. The operation repeats until the electrostatic force has been computed, in increments of 0.25 degree, from −8 degree to +8 degree. The result may be a lookup table, such as the example lookup table illustrated in FIG. 4B, that correlates electrostatic force and its associated angular displacement such as the one in FIG. 4B. In certain implementations, the electrostatic force may be converted to torque by multiplying the electrostatic force by the distance from the comb drive fingers 204a, 204b to the mirror's axis of rotation. Once generated, the lookup table 401 may be input into lookup table block 104. In certain implementations, the lookup table 401 may include a two row format rather than the two column format depicted in FIG. 4B.

In some embodiments, each time a new simulation is run using an adjusted set of design parameters, the lookup table may be updated as f(θ) may be dependent on the design parameters. By way of example and not limitation, the design parameters that may affect f(θ) may include, e.g., the length of the comb drive fingers 214a, 214b, the gap distance between the comb drive fingers 214a, 214b, the comb drive width, the scanning mirror dimensions (length, width, thickness), the scanning mirror weight, the distance between the scanning mirror 202 and anchors 204a, 204b, the Q-factor, spring dimensions, the number and location of springs, the spring constant, just to name a few.

Then f(θ) may be input into a second coefficient block 105, which configured to compute a second coefficient β using Equation (5) shown above. Second coefficient block 105 may then multiply the electrostatic force f(θ) with the second coefficient β, such that βf(θ) is output to the multiplier 111. Multiplier 111 may compute the entire comb drive force βf(θ)(γ+sin(ωτ))² from Equation (4) by multiplying the terms received from second coefficient block 105 and square block 110. Information associated with the comb drive force βf(θ)(γ+sin(ωτ))² is input into the second adder 112, which outputs $$\left(-\frac{1}{Q}\dot{\theta} - \left(\theta + r_3\theta^3\right)\right) + \beta f(\theta)(\gamma + \sin(\omega\tau))^2.$$

Because the entire simulation is performed for non-dimensional Equation (4), the first conversion block 115 may be configured to convert radian to degree. Second conversion block 114 may be configured to convert non-dimensional frequency ω to dimensional frequency Ω with units of Hz or kHz. After the non-dimensional quantities have been converted to dimensional quantities, the mirror oscillation block 116 may generate mirror oscillation data based at least in part on the comb drive force information converted to include corresponding dimensional quantities. In certain implementations, the mirror oscillation data may be a data file that correlates time, oscillation frequency, and angular displacement.

In this way, the computer model of the present disclosure may provide an accurate and efficient mechanism to compute performance characteristics of a scanning mirror during its design phase using a reduced amount of time and computational resources, as compared with conventional techniques.

Figure 5:
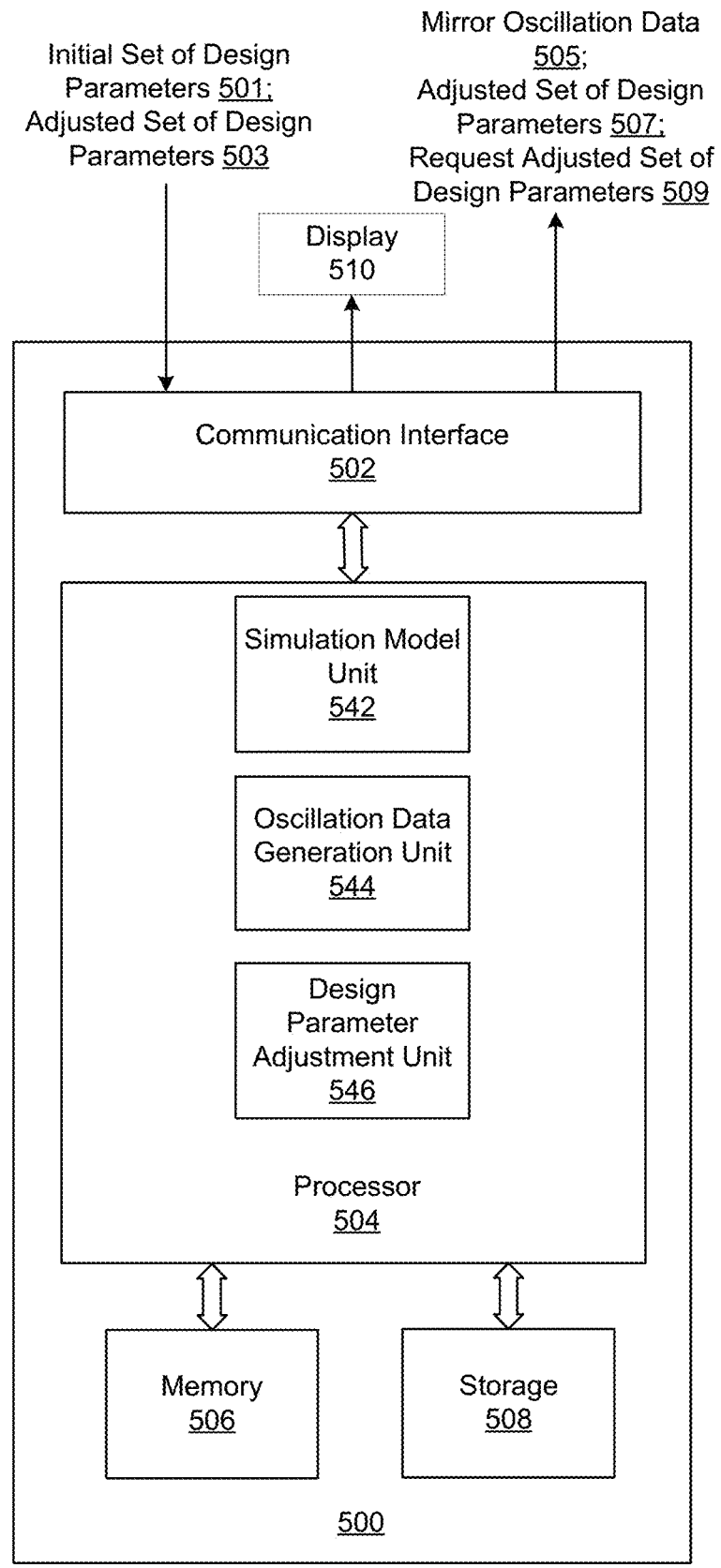
FIG. 5 illustrates a block diagram of an exemplary system for designing a scanning mirror, according to embodiments of the disclosure.

FIG. 5 illustrates a block diagram of an exemplary system 500 for designing a scanning mirror (e.g., MEMS mirror 1100 of FIG. 1), according to embodiments of the disclosure. In some embodiments, as shown in FIG. 5, system 500 may include a communication interface 502, a processor 504, a memory 506, and a storage 508. In some embodiments, system 500 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of system 500 may be located in a cloud or may be alternatively in a single location (such as inside a mobile device) or distributed locations. Components of system 500 may be in an integrated device or distributed at different locations but communicate with each other through a network (not shown). Consistent with the present disclosure, system 500 may be configured to determine the design parameter values of the scanning mirror.

Communication interface 502 may send data to and receive data from databases via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 502 may include an integrated service digital network (ISDN) card, cable modem, satellite modem, or a modem to provide a data communication connection. As another example, communication interface 502 may include a local area network (LAN) card to provide a data communication connection to a compatible LAN. Wireless links can also be implemented by communication interface 502. In such an implementation, communication interface 502 can send and receive electrical, electromagnetic or optical signals that carry digital data streams representing various types of information.

Consistent with some embodiments, communication interface 502 may receive an initial set of design parameters 501 and/or an adjusted set of design parameters 503 from a database or a user input (not shown). Communication interface 502 may further provide the initial set of design parameters 501 to memory 506 and/or storage 508 for storage or to processor 504 for processing.

Processor 504 may include any appropriate type of general-purpose or special-purpose microprocessor, digital signal processor, or microcontroller. Processor 504 may be configured as a separate processor module dedicated to simulating scanning mirror oscillation and computing performance characteristics based on the initial set of design parameters 501. Processor 504 may be configured as computational toolbox that includes a plurality of functional blocks configured as a computer model for simulating the scanning mirror oscillation. Alternatively, processor 504 may be configured as a shared processor module for performing other functions in addition to determining design parameter values and making design changes of the scanning mirror.

Memory 506 and storage 508 may include any appropriate type of mass storage provided to store any type of information that processor 504 may need to operate. Memory 506 and storage 508 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 506 and/or storage 508 may be configured to store one or more computer programs that may be executed by processor 504 to perform functions disclosed herein. For example, memory 506 and/or storage 508 may be configured to store program(s) that may be executed by processor 504 to determine design parameter values of the scanning mirror.

In some embodiments, memory 506 and/or storage 508 may also store various scanning mirror design parameters including e.g., initial design parameters and adjusted design parameters associated with structural alterations (e.g., holes, air dams, etc.), target performance characteristics for various scanning mirror designs, one or more look-up tables that correlate electrostatic force as a function of angular displacement for various scanning mirror designs, and/or a computer model configured to simulate scanning mirror oscillation, etc. Memory 506 and/or storage 508 may also store information associated with Equations (1)-(8) used to simulate scanning mirror oscillation and to compute performance characteristics as a result of the simulation, etc.

As shown in FIG. 5, processor 504 may include multiple modules, such as a simulation model unit 542, oscillation data generation unit 544, a design parameter adjustment unit 546, and the like. These modules (and any corresponding sub-modules or sub-units) can be hardware units (e.g., portions of an integrated circuit) of processor 504 designed for use with other components or software units implemented by processor 504 through executing at least part of a program. The program may be stored on a computer-readable medium, and when executed by processor 504, it may perform one or more functions. Although FIG. 5 shows units 542-546 all within one processor 504, it is contemplated that these units may be distributed among different processors located closely or remotely with each other. For example, units 542-544 may be part of a separate simulation device and unit 546 may be part of a design parameter generation device. In certain implementations, one or more of units 542-546 may be omitted, depending on the specific design task.

Figure 6:
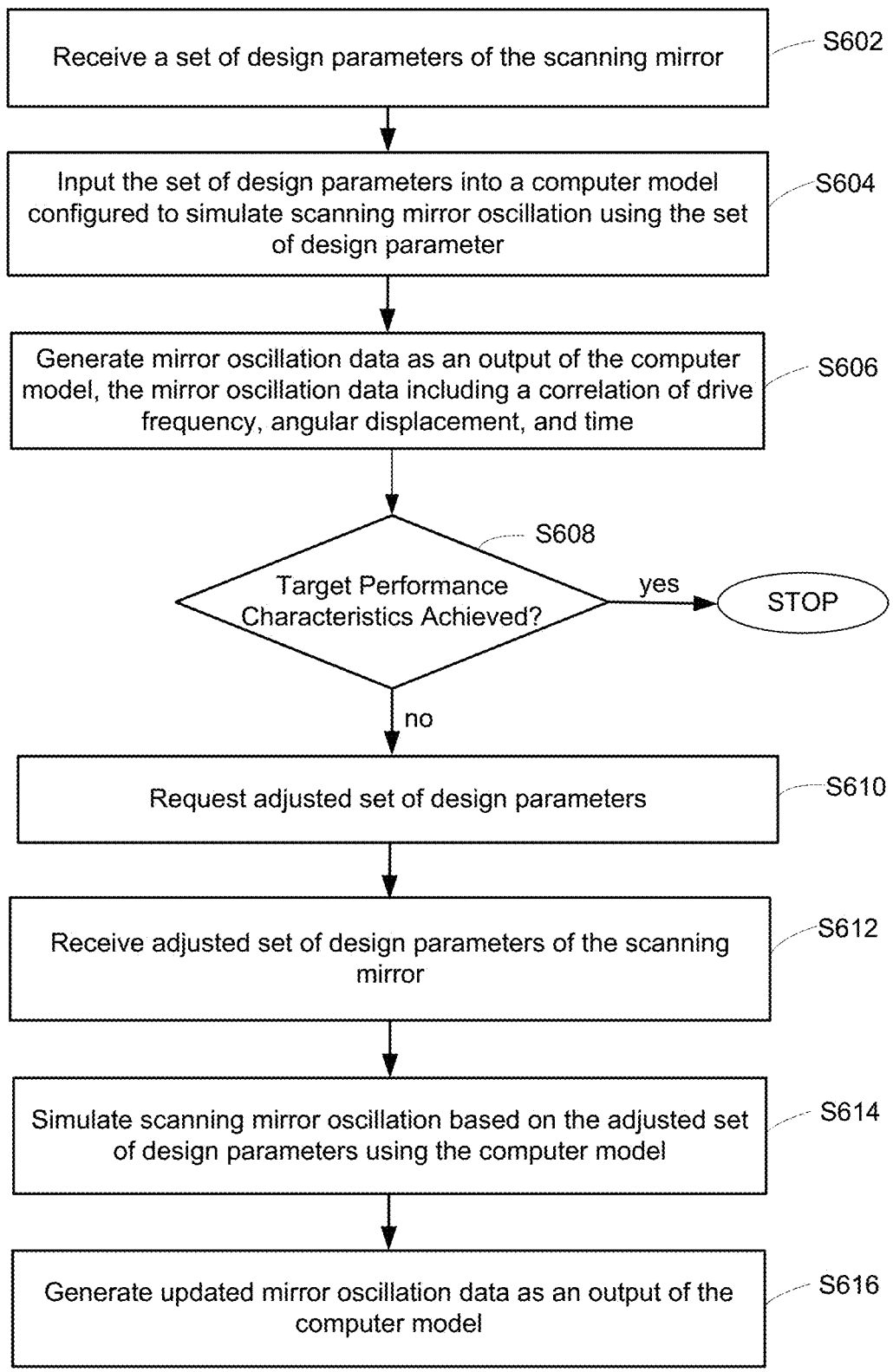
FIG. 6 illustrates a flow chart of an exemplary method for designing a scanning mirror, according to embodiments of the disclosure.

In some embodiments, one or more of units 542-546 of FIG. 5 may execute first computer instructions to design a scanning mirror. FIG. 6 illustrates a flowchart of an exemplary method 600 for designing scanning mirrors, according to embodiments of the disclosure. Method 600 may be performed by system 500 and particularly processor 504 or a separate processor not shown in FIG. 5. Method 600 may include steps S602-S612 as described below. It is to be appreciated that some of the steps may be optional, and some of the steps or sub-steps may be performed simultaneously, or in a different order than shown in FIG. 6. FIGS. 5 and 6 will be described together, as shown below.

In step 602, communication interface 602 may receive an initial set of design parameters 501 (e.g., design parameters associated with scanning mirror design 200 of FIG. 2) of the scanning mirror. The initial set of design parameters 501 may include, e.g., mirror size, Q-factor, comb finger number, distance between comb fingers, length of comb fingers, drive frequency and amplitude, spring dimension, linear spring constant, spring nonlinearity, just to name a few.

In step 604, the simulation model unit 542 simulate scanning mirror oscillation based on the initial set of design parameters 501 using a computer model. In certain embodiments, the computer model may include a lookup table that correlates electrostatic force applied to a sample scanning mirror and angular displacement in the sample scanning mirror caused by the electrostatic force. The sample scanning mirror may be, for example, a simulation of a scanning mirror that includes a predetermined set of design parameters. Step 604 may include one or more sub-steps as described below.

For example, referring to one aspect of step 604, simulation model unit 542 may simulate scanning mirror oscillation by computing a first coefficient $\gamma$ and a second coefficient $\beta$ based at least in part on the initial set of design parameters 501. For example, referring to FIG. 3A, first computational toolbox 309 may include a first coefficient block 106 configured to compute $\gamma$ (first coefficient) based at least in part on the set of design parameters. For example, $\gamma$ may be computed using Equation (5), shown above. Moreover, first computational toolbox 309 may include a second coefficient block 105 configured to compute second coefficient $\beta$ using Equation (5), shown above.

In certain other aspects of step 604, simulation model unit 542 may simulate scanning mirror oscillation by determining electrostatic force information associated with a scanning angle using the lookup table. For example, referring to FIGS. 3A, 4A, and 4B, first computational toolbox 309 may include a lookup table block 104 comprising a lookup table that correlates electrostatic force/torque f of the comb drive fingers 214a, 214b as a function of angular displacement $\theta$. FIG. 4A shows a graphical representation 400 of f($\theta$) for a single comb drive unit (e.g., a single fixed drive comb finger 206a and the counterpart sliding drive comb fingers 206b) for simplicity. Then, the electrostatic force computed for a single comb drive unit may be multiplied by the total number of comb drive units indicated in the set of design parameters to determine the electrostatic force that is included in the lookup table. Because the electrostatic force as a function of angular displacement is nonlinear, generating the lookup table may include operations performed incrementally across the entirety of the mirror's scanning angle (e.g., from −8 degree to +8 degree). For example, the electrostatic force may be computed in 0.25 degree increments from −8 degree to +8 degree. Using the same example, once the electrostatic force is computed for 0.25 degree, the electrostatic force is then computed for an angular displacement of 0.5 degree. The operation repeats until the electrostatic force has been computed, in increments of 0.25 degree, from −8 degree to +8 degree. The result may be a lookup table, such as the example lookup table illustrated in FIG. 4B, that correlates electrostatic force and its associated angular displacement such as the one in FIG. 4B. In certain implementations, the electrostatic force may be converted to torque by multiplying the electrostatic force by the distance from the comb drive fingers 204a, 204b to the mirror's axis of rotation. Once generated, the lookup table 401 may be input into lookup table block 104.

In still further aspects of step 604, simulation model unit 542 may simulate scanning mirror oscillation by inputting angular acceleration information associated with the scanning mirror into the computer model. For example, referring to FIG. 3A, angular acceleration information $\ddot{\theta}$ may be input into first integrator 100 of first computational toolbox 309.

In still another aspect of step 604, simulation model unit 542 may simulate scanning mirror oscillation by converting the angular acceleration information into angular velocity information. For example, referring to FIG. 3A, first integrator 100 may be configured to convert angular acceleration information $\ddot{\theta}$ to angular velocity information $\dot{\theta}$. First integrator 100 may send the angular velocity information $\dot{\theta}$ to a second integrator 101.

In further aspects of step 604, simulation model unit 542 may simulate scanning mirror oscillation by converting the angular velocity information into angular displacement information. For example, referring to FIG. 3A, second integrator 101 may be configured to convert the angular velocity information $\dot{\theta}$ to angular displacement information $\theta$.

In certain aspects of step 604, simulation model unit 542 may simulate scanning mirror oscillation by computing a damping force based at least in part on the angular velocity information. For example, referring to FIG. 3A, angular velocity information $\dot{\theta}$ may be input into a damping force block 102, which is configured to compute a damping force $$\frac{1}{Q}\dot{\theta}$$

based at least in part on the angular velocity information $\dot{\theta}$ and Q-factor information, which is a design parameter that is input into damping force block 102 prior to or at the start of the simulation.

In certain aspects of step 604, simulation model unit 542 may simulate scanning mirror oscillation by computing a spring force based at least in part on the angular displacement information. For example, referring to FIG. 3A, angular displacement information $\theta$ may be input into a spring force block 103, which may be configured to compute the spring force term $(\theta+r_3\theta^3)$ in Equation (4) based at least in part on the angular displacement information $\theta$ and spring constant ratio $r_3$.

In certain aspects of step 604, simulation model unit 542 may simulate scanning mirror oscillation by generating waveform information associated with an oscillation frequency used to drive the scanning mirror. In some embodiments, the waveform information may be sinusoidal waveform information. For example, referring to FIG. 3A, first computational toolbox 309 may further include a first waveform block 107 configured to generate sinusoidal waveform information $\sin(\omega\tau)$ associated with a drive voltage applied to the comb drive fingers 204a, 204b. Frequency $\omega$ may be the characteristic oscillation frequency associated with a scanning mirror and may vary depending on the set of design parameters. The characteristic oscillation frequency $\omega$ may be computed based at least in part on the scanning mirror's Q-factor (e.g., which may be computed prior to or at the start of the simulation). Once computed, information associated with the characteristic oscillation frequency $\omega$ may be input into first waveform block 107. First waveform block 107 may be a sinusoidal waveform generator '$\sin(\omega\tau)$' where frequency $\omega$ can be varied from low to high (up sweeping) or from high to low (down sweeping). Frequency doubler 108 may be configured to double the waveform frequency $\omega$ to simulate driving the scanning mirror with a voltage whose frequency is twice waveform frequency $\omega$. A drive voltage frequency that is twice the mirror's characteristic oscillation frequency $\omega$ is used to sustain oscillation around an axis of rotation.

In certain aspects of step 604, simulation model unit 542 may simulate scanning mirror oscillation by converting the sinusoidal waveform information to square waveform information. For example, referring to FIG. 3B, rather than being driven with a drive voltage of sinusoidal waveform, scanning mirror 202 may be driven using a drive voltage of square waveform described above in Equation (7). Operations associated with Equation (7) may be implemented using second waveform block 200, where (u>0) returns +1 for u>0 and otherwise returns 0, and (u≤0) returns +1 for u≤0 and otherwise returns 0.

In still other aspects of step 604, simulation model unit 542 may simulate scanning mirror oscillation by converting the sinusoidal waveform information to waveform information of a predetermined waveform shape different from sinusoidal. For example, referring to FIG. 3C, rather than using a sinusoidal or square waveform, the sinusoidal waveform may be converted to a predetermined waveform shape that is non-sinusoidal (also referred to as "arbitrary") by third waveform block 300. Since the driving frequency is varying for the chirping signal output by frequency doubler 108, the driving voltage amplitude may be saved in lookup table block 301 for a single period from 0 to $2\pi$. Third block 300 may be configured to input a phase from 0 to $2\pi$ to arbitrary waveform block 301, as expressed above in Equation (8).

In still other aspects of step 604, simulation model unit 542 may simulate scanning mirror oscillation by computing drive voltage information based at least in part on the first coefficient and the waveform information. For example, referring to FIG. 3A, first computational toolbox 309 may include a first coefficient block 106 configured to compute $\gamma$ (first coefficient) based at least in part on the set of design parameters. For example, $\gamma$ may be computed using Equation (5), shown above. Information associated with first coefficient $\gamma$ may be input into second adder 109. Second adder 109 may be configured to compute the drive voltage term $(\gamma+\sin(\omega\tau))$ from Equation (4) by summing the information received from first waveform block 107 and first coefficient block 106. Drive voltage information $\gamma+\sin(\omega\tau)$ may be input into square block 110, which may output a square of drive voltage $(\gamma+\sin(\omega\tau))^2$ to the multiplier 111.

In further aspects of step 604, simulation model unit 542 may simulate scanning mirror oscillation by computing a comb drive force information based at least in part on the drive voltage information, the electrostatic force information, and the second coefficient. For example, referring to FIG. 3A, f(θ) may be input into a second coefficient block 105, which is configured to compute a second coefficient β using Equation (5) shown above. Second coefficient block 105 may then multiply the electrostatic force f(θ) with the second coefficient β, such that βf(θ) is output to the multiplier 111. Multiplier 111 may compute the entire comb drive force $\beta f(\theta)(\gamma+\sin(\omega\tau))^2$ from Equation (4) by multiplying the terms received from second coefficient block 105 and square block 110. Information associated with the comb drive force $\beta f(\theta)(\gamma+\sin(\omega\tau))^2$ is input into the second adder 112, which outputs $$\left(-\frac{1}{Q}\dot{\theta}-\left(\theta+r_3\theta^3\right)\right)+\beta f(\theta)(\gamma+\sin(\omega\tau))^2.$$

In still other aspects of step 604, simulation model unit 542 may simulate scanning mirror oscillation by converting one or more non-dimensional quantities in the comb drive force information to corresponding dimensional quantities to generate the mirror oscillation data. For example, referring to FIG. 3A, Because the entire simulation is performed for non-dimensional Equation (4), the first conversion block 115 may be configured to convert radian to degree. Second conversion block 114 may be configured to convert non-dimensional frequency ω to dimensional frequency Ω with units of Hz or kHz.

Turning to step 606, oscillation data generation unit 544 may generate mirror oscillation data 505 as an output of the computer model for designing the scanning mirror. The mirror oscillation data may include a correlation of drive frequency, angular displacement, and time. For example, referring to FIG. 3A, after the non-dimensional quantities have been converted to dimensional quantities, the mirror oscillation block 116 may generate mirror oscillation data based at least in part on the comb drive force information converted to include corresponding dimensional quantities. In certain implementations, the mirror oscillation data may be a data file that correlates time, oscillation frequency, and angular displacement.

At step 608, design parameter adjustment unit 546 may make a determination as to whether the target performance characteristics are met with the current set of design parameters. The design process may conclude if the scanning mirror design meets the target performance characteristics is achieved. In certain implementations, if the target performance characteristics are not met, design parameter adjustment unit 546 may further determine appropriate design alterations based on a comparison of the computed performance characteristic(s) and target performance characteristic(s). The design alterations may be included as part of the output to user (e.g., a mirror designer) for consideration. The user may update the set of design parameters based on the suggested design alterations and input an adjusted set of design parameters. Upon determining, at step 608, that the design parameters meet the target performance characteristics, the operation may conclude, and the mirror oscillation data may be saved or output to a user. Otherwise, upon determining, at step 508, that the design parameters do not meet the target performance characteristics, the operation may move to step 610.

At step 610, communication interface 502 may request 509 an adjusted set of design parameters. In certain implementations, the request 509 may suggest adjustments to the set of design parameters. In certain other implementations, the request 509 may omit suggested adjustments to the set of design parameters. The request 509 may include a prompt of message output on the display 510.

At step 612, communication interface 502 may receive the adjusted set of design parameters of the scanning mirror. For example, when the computed performance characteristics do not meet the target performance characteristics, an adjusted set of design parameters may be proposed, and the simulation may be rerun.

At step 614, simulation model unit 542 may simulate scanning mirror oscillation based on the adjusted set of design parameters using the computer model. For example, one or more of the sub-steps described above in connection with step 604 may be performed using the adjusted set of design parameters.

At step 616, the simulation model unit 542 may generate updated mirror oscillation data 505 as an output of the computer model. The operations associated with step 606 may be performed for the adjusted set of design parameters to generate updated mirror oscillation data.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A non-transitory computer-readable medium having a computational toolbox stored thereon, the computational toolbox configured to simulate scanning mirror oscillation using a set of design parameters,
   wherein the computational toolbox comprises a plurality of functional blocks configured as a computer model for simulating the scanning mirror oscillation, the functional blocks including a lookup table block storing a lookup table that correlates electrostatic force applied to a sample scanning mirror and angular displacement in the sample scanning mirror caused by the electrostatic force,
   wherein the computer model simulates the scanning mirror oscillation in non-dimensional quantities and converts the scanning mirror oscillation to generate mirror oscillation data in dimensional quantities.

2. The non-transitory computer-readable medium of claim 1, wherein the plurality of functional blocks further comprises:
   a first coefficient block configured to compute a first coefficient based at least in part on the set of design parameters; and
   a second coefficient block configured to compute a second coefficient based at least in part on the set of design parameters.

3. The non-transitory computer-readable medium of claim 2, wherein the plurality of functional blocks further comprises:
   a first integrator configured to convert angular acceleration information into angular velocity information; and
   a second integrator configured to convert the angular velocity information into angular displacement information.

4. The non-transitory computer-readable medium of claim 3, wherein the plurality of functional blocks further comprises:
   a damping force block configured to compute a damping force based at least in part on the angular velocity information; and
   a spring force block configured to compute a spring force based at least in part on the angular displacement information.

5. The non-transitory computer-readable medium of claim 4, wherein the plurality of functional blocks further comprises:
   a first waveform block configured to generate sinusoidal waveform information associated with a drive force frequency.

6. The non-transitory computer-readable medium of claim 5, wherein the plurality of functional blocks further comprises:
   a second waveform block configured to convert the sinusoidal waveform information to square waveform information;
   a third waveform block configured to convert the sinusoidal waveform information to waveform information of a predetermined waveform shape different from sinusoidal;
   a drive voltage block configured to compute drive voltage information based at least in part on the first coefficient and the waveform;
   a comb drive force block configured to compute comb drive force information based at least in part on the drive voltage information, electrostatic force information, and the second coefficient;
   at least one conversion block configured to convert one or more non-dimensional quantities in the comb drive force information to corresponding dimensional quantities; and
   a mirror oscillation block configured to generate mirror oscillation data based at least in part on the comb drive force information converted to include corresponding dimensional quantities.

7. A method for designing a scanning mirror for an optical sensing system, comprising:
   receiving, by a communication interface, a set of design parameters of the scanning mirror;
   simulating scanning mirror oscillation, by at least one processor, based on the set of design parameters using a computer model, the computer model including a lookup table that correlates electrostatic force applied to a sample scanning mirror and angular displacement in the sample scanning mirror caused by the electrostatic force;
   generating, by the at least one processor, mirror oscillation data as an output of the computer model for designing the scanning mirror, the mirror oscillation data including a correlation of drive frequency, angular displacement, and time; and
   requesting, by the at least one processor, an adjusted set of design parameters of the scanning mirror when the mirror oscillation data do not meet a target performance,
   wherein the computer model simulates the scanning mirror oscillation in non-dimensional quantities and converts the scanning mirror oscillation to generate the mirror oscillation data in dimensional quantities.

8. The method of claim 7, further comprising:
   receiving, by the communication interface, the adjusted set of design parameters of the scanning mirror;
   simulating scanning mirror oscillation, by the at least one processor, based on the adjusted set of design parameters using the computer model; and
   generating, by the at least one processor, updated mirror oscillation data as an output of the computer model.

9. The method of claim 7, further comprising:
   determining design alterations based on a comparison of the mirror oscillation data and the target performance; and
   providing the design alternations when requesting the adjusted set of design parameters of the scanning mirror.

10. The method of claim 7, wherein the simulating the scanning mirror oscillation further comprises:
   determining, by the at least one processor, electrostatic force information associated with a scanning angle using the lookup table.

11. The method of claim 10, wherein the simulating the scanning mirror oscillation further comprises:
   inputting, by the at least one processor, angular acceleration information associated with the scanning mirror into the computer model;
   converting, by the at least one processor, the angular acceleration information into angular velocity information; and
   converting, by the at least one processor, the angular velocity information into angular displacement information.

12. The method of claim 11, wherein the simulating the scanning mirror oscillation further comprises:
   computing, by the at least one processor, a damping force based at least in part on the angular velocity information; and
   computing, by the at least one processor, a spring force based at least in part on the angular displacement information.

13. The method of claim 12, wherein the simulating the scanning mirror oscillation further comprises:
   generating, by the at least one processor, waveform information associated with a drive voltage frequency used to drive the scanning mirror.

14. The method of claim 13, wherein the waveform information is sinusoidal waveform information.

15. The method of claim 14, wherein the simulating the scanning mirror oscillation further comprises:
   converting, by the at least one processor, the sinusoidal waveform information to square waveform information.

16. The method of claim 14, wherein the simulating the scanning mirror oscillation further comprises:
   converting, by the at least one processor, the sinusoidal waveform information to waveform information of a predetermined waveform shape different from sinusoidal.

17. The method of claim 13, wherein the simulating the scanning mirror oscillation further comprises:

computing, by the at least one processor, a first coefficient and a second coefficient based at least in part on the set of design parameters; and computing, by the at least one processor, drive voltage information based at least in part on the first coefficient and the waveform information.

18. The method of claim 17, wherein the simulating the scanning mirror oscillation further comprises:

computing, by the at least one processor, a comb drive force information based at least in part on the drive voltage information, the electrostatic force information, and the second coefficient.

19. The method of claim 18, wherein the simulating the scanning mirror oscillation further comprises:

converting, by the at least one processor, one or more non-dimensional quantities in the comb drive force information to corresponding dimensional quantities to generate the mirror oscillation data.

20. An apparatus for designing a scanning mirror for an optical sensing system, comprising:

a communication interface configured to receive a set of design parameters of the scanning mirror;

a memory configured to store a computer model configured to simulate scanning mirror oscillation; and at least one processor coupled to the memory and configured to:

simulate scanning mirror oscillation, by at least one processor, based on the set of design parameters using a computer model, the computer model including a lookup table that correlates electrostatic force applied to a sample scanning mirror and angular displacement in the sample scanning mirror caused by the electrostatic force;

generate, by the at least one processor, mirror oscillation data as an output of the computer model for designing the scanning mirror, the mirror oscillation data including a correlation of drive frequency, angular displacement, and time; and requesting an adjusted set of design parameters of the scanning mirror when the mirror oscillation data do not meet a target performance, wherein the computer model simulates the scanning mirror oscillation in non-dimensional quantities and converts the scanning mirror oscillation to generate the mirror oscillation data in dimensional quantities.

* * * * *